UNITED STATES PATENT OFFICE.

OSCAR WARREN PICKERING, OF SPRINGFIELD, MASSACHUSETTS, ASSIGNOR TO PICKERING PAINT AND PIGMENT COMPANY, A CORPORATION OF WEST VIRGINIA.

MAGNESIUM-CONTAINING PIGMENT AND PAINT.

1,211,346.     Specification of Letters Patent.     Patented Jan. 2, 1917.

No Drawing.     Application filed June 2, 1916. Serial No. 101,357.

*To all whom it may concern:*

Be it known that I, OSCAR WARREN PICKERING, a citizen of the United States, residing at Springfield, in the county of Hampden and State of Massachusetts, have invented certain new and useful Improvements in Magnesium - Containing Pigment and Paint, of which the following is a specification.

This invention relates to a new pigment and paint thereof, and has for some of its objects the production of a paint or pigment which will have greater spreading power, less disintegrating or decomposing nature when exposed to ingredients of or associated with the atmosphere, more permanency or stability when exposed to light, greater opacity of body, less specific gravity, whereby the settling out from the paint vehicle is prevented, which will be more readily miscible with oils or other vehicles than such substances as are commonly employed, and which will produce greater and better results as to spreading power and durability than pigments or paints of specifically related character employed hitherto, and it comprises a compound or composition of metal, such as magnesium, with aluminium and oxygen in the form of metal or magnesium aluminate, or its equivalent, or the same associated with a vehicle, such as an oil or drying oil, and more particularly of the linseed oil type, and in some cases with a diluent of drying nature, such as turpentine in the form of paint or similar commodity.

One of the difficulties experienced in the employment of pigments in the prior art, in or as a paint associated with such vehicles as linseed oil or turpentine, is that the specific gravity of the compound or composition of the pigment is such that it soon separates or settles out from the vehicle in a mixed paint, which requires the re-mixing of the paint to obtain uniform consistency before it is used, or the re-mixing from time to time to prevent the settling in order to keep or maintain the paint in a utilizable condition. This is avoided in the present invention by the union, combination, or association of the metal of the pigment base with aluminium and oxygen in the form of an aluminate, which renders the compound or composition of light, flocculent character rather than of dense, impervious nature whereby its assimilation with and suspension in the paint vehicle employed is assured and maintained.

The magnesium aluminate which is preferred is the normal aluminate produced by the action of magnesium sulfate on sodium aluminate, which reaction may be illustrated by the following chemical form or equation:

$$Na_2Al_2O_4 + MgSO_4 + xH_2O = MgAl_2O_4 + Na_2SO_4 + xH_2O.$$

The sodium sulfate by-product is washed out of the magnesium aluminate precipitate and the magnesium aluminate produced thoroughly dried, whereby a light, flocculent white product of superior mixing quality with oils, and producing a paint which readily spreads and presenting a body covering of great light diffusive quality, results, and especially when associated with such oils as linseed, tung, and the like, or the same associated with driers, such as turpentine.

Instead of a pigment composed of magnesium aluminate *per se*, magnesium aluminate may be associated with aluminium hydroxid, whereby the utility of the magnesium aluminate may be enhanced and its spreading power and permanency increased. This compound or composition of magnesium aluminate and aluminium hydroxid may be produced by acting on a mixture of an excess of sodium aluminate associated with magnesium sulfate, containing an equivalent of sulfuric acid or other acid capable of liberating aluminium hydroxid from sodium aluminate, whereby the two compounds, viz: magnesium aluminate and aluminium hydroxid, are simultaneously thrown down or precipitated from the aqueous solution of the compounds referred to in such an intimate state of division and admixture as to present the appearance of an actual chemical compound, which might be considered a basic magnesium aluminate or perhaps more correctly described or designated as a magnesium acido-aluminic aluminate.

It will be noted that the compound comprising magnesium aluminate is flocculent or bulky, yielding a paint when associated with a vehicle, of increased volume over paints of the prior art per equal weight, making a product of superior utility as to spreading power and light diffusive density or body, which is cheaper as to cost and more economical in manufacture, producing a product which is more permanent in character as to action of light and resistance to atmospheric decomposition.

It is obvious that the magnesium aluminate may be produced in any convenient manner other than that described and that the pigment may be associated with any selective vehicle in producing a paint without departing from the spirit of the invention, which broadly comprises a new paint or pigment comprising magnesium aluminate or its equivalent, either associated or combined with a like or unlike metal hydroxid or hydrate, specifically aluminium hydroxid or hydrate, or such compound or composition associated with a paint vehicle, such as a drying oil (linseed), or the same with a drier (turpentine).

In manufacturing, shipping, or dispensing of mixed paints, the mineral constituents, such as magnesium aluminate as a pigment, is of greater utility in that its lesser specific gravity than other pigments ordinarily employed maintains it in a mixed or suspended condition in the paint vehicle, thus avoiding the settling out of the pigment to a great extent, and yielding a more uniformly mixed paint and maintained as such, which is of greater durability, spreading power, and practical utility than the pigments or paints of mixed character employed hitherto. Any kind or character of magnesium aluminate may be employed other than the normal aluminate, which aluminate may be of simple, compound, complex, or composite nature, and may be associated with like or unlike metal hydroxid in chemical combination or physical association without departing from the spirit of the invention, and any other metal hydroxid may be substituted for the aluminium hydroxid in the magnesium aluminate, compound, or composition, such as hydroxid of lead, of zinc, of magnesium, etc.

It is obvious that the metal of the aluminate may exist at any valency and the aluminate may comprise the normal, basic, acidic, or other variety without departing from the spirit of the invention.

It should be noted that the pigment comprising magnesium aluminate in accordance with the present invention as an ingredient of paint is of flocculent character and nature and would readily take up and assimilate with oils and other vehicles, and being preferably a precipitated product, is of such pervious and flocculent nature that it remains suspended in, carried by and permeated with the vehicle in a permanent manner as distinguished from dense, vitreous products produced by fusion, which do not assimilate with oils or other vehicles, and easily settle out therefrom.

The term or expression "paint" as employed herein is intended to imply and does imply a pigment or dry paint as such or associated with a vehicle or carrier of any suitable kind, preferably of liquid character, capable of enabling the associated pigment or dry paint to be spread on a surface in a coating by means of a brush or its equivalent; the term or expression "vehicle" implies a pigment or dry paint carrier, preferably of fluid nature, which may consist of or comprise any suitable character comprising one which may evaporate entirely, leaving the pigment or dry paint upon the surface or within the pores of the article to which it is applied, such as water, benzin, etc., or the same associated with a paint fixative, such as gum, resin, casein compounds, etc., or it may comprise an oil of any suitable kind, such as a petroleum product, vegetable oil of drying or non-drying character, etc., so long as it acts to carry the pigment or dry paint and enhance the spreading thereof by action of a brush or its equivalent, or the oil and pigment may be associated with a suitable fixative or drier; and the term "drier" implies a substance or constituent of the oil or paint composition which is capable of fixing the oil or paint by transforming it into a gelatinous or non-fluid condition by acting as an oyxgen carrier to the oil, forming a non-fluid oil oxygenated compound, such as linoxyn, or an oil setting or gelatinant, such as metal soap or oleates or resinates, either directly employed or formed in the paint by interaction of the ingredients, such as the resin acids formed by oxidation of turpentine and their action on a pigment or dry paint metal compound constituent. For example, the drying or transforming of a fluid non-drying petroleum product or vegetable oil into a non-fluid or fixed gelatinous condition, as a pigment or dry paint vehicle or fixative may be accomplished by associating the pigment or dry paint, such as magnesium aluminate and non-drying vegetable oil, such as cottonseed oil, with turpentine which, when it is spread on a surface and exposed to oxygen of the air, results in the conversion of the turpentine into resin acid aldehydes, which united with the magnesium and aluminium content form resinates and resin and aliphatic or oleic acid esters, and glycerin resinates, all of which products, resinates, oleates, glycerinates and esters increase the viscosity, absorb, combine with, retain, or occlude the excess of oil and the pigment, transforming the whole into a gelatinous or non-fluid and substantially dry condition, just as water is retained or dried by gelatin or glue; in this manner oils of ordinarily non-drying character may be employed as well as drying oils as paint vehicles with and for pigments of the metal aluminate variety.

It will be noted that the pigment, such as magnesium aluminate, may be modified by combination or association with a metal hydroxid or hydrate, such as aluminium hydroxid or hydrate, and the vehicle, such as an oil or a drying oil, may also be modified by combination or association with a drier, such as turpentine, whereby the utility of either or both the pigment or the vehicle may be augmented, and the combined results rendered available and the general utility of the product enhanced, whereby functions are performed and results obtained differing from those inherent in either of the members of the combination thereof, independently or separately.

Having now described my invention what I claim is:

1. A new pigment, comprising flocculent magnesium aluminate.
2. A paint, comprising magnesium aluminate and a vehicle.
3. A paint, comprising magnesium aluminate and an oil.
4. A paint, comprising magnesium aluminate and a drying oil.
5. A paint, comprising magnesium aluminate, an oil, and a drier.
6. A paint, comprising magnesium aluminate, a drying oil, and a drier.
7. A paint, comprising magnesium aluminate, an oil, and turpentine.
8. A paint, comprising magnesium aluminate, a drying oil, and turpentine.
9. A new pigment, comprising magnesium aluminate and a metal hydroxid.
10. A new pigment, comprising magnesium aluminate and aluminium hydroxid.
11. A paint, comprising magnesium aluminate, a metal hydroxid, and a vehicle.
12. A paint, comprising mechanism aluminate, aluminium hydroxid, and a vehicle.
13. A paint, comprising magnesium aluminate, a metal hydroxid, and an oil.
14. A paint, comprising magnesium aluminate, aluminium hydroxid, and an oil.
15. A paint, comprising magnesium aluminate, a metal hydroxid, and a drying oil.
16. A paint, comprising magnesium aluminate, aluminium hydroxid, and a drying oil.
17. A paint, comprising magnesium aluminate, a metal hydroxid, an oil, and a drier.
18. A paint, comprising magnesium aluminate, aluminium hydroxid, an oil, and a drier.
19. A paint, comprising magnesium aluminate, a metal hydroxid, a drying oil, and a drier.
20. A paint, comprising magnesium aluminate, aluminium hydroxid, a drying oil, and a drier.
21. A paint, comprising magnesium aluminate, a metal hydroxid, an oil, and turpentine.
22. A paint, comprising magnesium aluminate, aluminium hydroxid, an oil, and turpentine.
23. A paint, comprising magnesium aluminate, a metal hydroxid, a drying oil, and turpentine.
24. A paint, comprising magnesium aluminate, aluminium hydroxid, a drying oil, and turpentine.
25. A paint, comprising magnesium aluminate, a metal hydroxid, linseed oil, and turpentine.
26. A paint, comprising magnesium aluminate, aluminium hydroxid, linseed oil, and turpentine.

In testimony whereof, I affix my signature in the presence of two witnesses.

OSCAR WARREN PICKERING. [L. S.]

Witnesses:
WALTER D. KEMP,
F. L. WHORTNER.